Aug. 29, 1967 A. CSICSATKA 3,339,025
DE-EMPHASIS NETWORK ARRANGEMENT FOR AM-FM RADIOS
Filed June 1, 1965
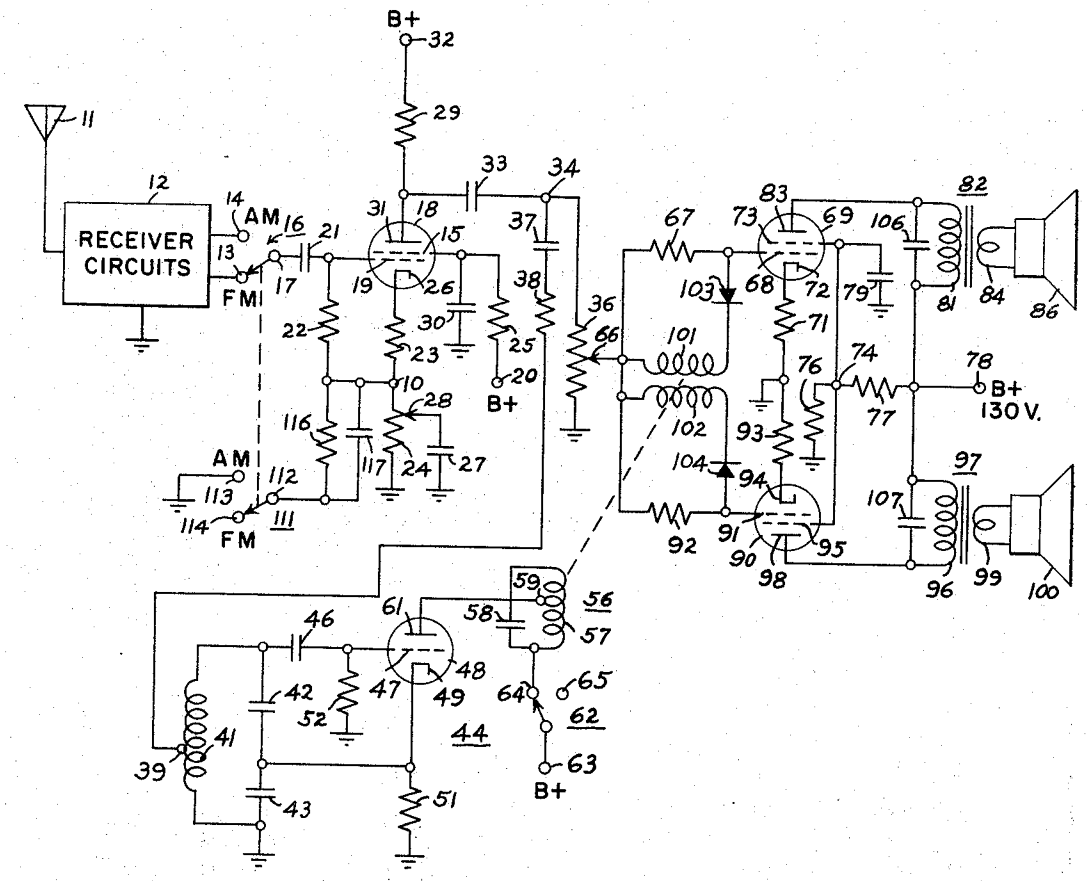
INVENTOR:
ANTAL CSICSATKA,
BY Norman C. Fulmer
HIS ATTORNEY.

3,339,025

DE-EMPHASIS NETWORK ARRANGEMENT FOR AM-FM RADIOS

Antal Csicsatka, Utica, N.Y., assignor to General Electric Company, a corporation of New York Filed June 1, 1965, Ser. No. 460,165
1 Claim. (Cl. 179—15)

This invention relates to AM-FM radios for alternatively receiving amplitude modulated signals and frequency modulated signals, and more particularly relates to AM-FM radios provided with de-emphasis networks for use in reception of pre-emphasized FM signals. The invention is particularly useful in radios equipped for FM stereo reception.

In FM broadcasting, it is customary at the transmitter to pre-emphasize the audio signal, i.e. to relatively boost the amplitude of the higher audio frequencies. Correspondingly, in the receivers it is customary to de-emphasize the audio signal in a manner converse to the pre-emphasis characteristic, in order to obtain a net result of a "flat" frequency response characteristic. The purpose of the pre-emphasis and de-emphasis is to improve the signal-to-noise ratio at the higher audio frequencies. In FM stereo systems, pre-emphasis and de-emphasis is employed for each of the "left" and "right" stereo audio signals. In AM broadcasting, pre-emphasis is not employed, and therefore de-emphasis networks are undesirable and are not employed in AM receivers. The present invention will be described as applied to a stereophonic receiver circuit of the time-sampling type in which a combined de-emphasis and integrating network is employed in each stereo audio channel, as is described and claimed in co-pending patent application Ser. No. 460,459 which is assigned to the same assignee as the present invention.

An object of the invention is to provide an improved AM-FM radio circuit.

Another object is to provide an improved de-emphasis network arrangement for AM-FM radios.

A further object is to provide economical and effective audio amplifier circuitry for use in receivers for AM, FM, and FM stereo reception, which circuitry achieves de-emphasis of audio signals derived from FM monaural and stereophonic broadcasts and which prevents de-emphasis of audio signals derived from FM broadcasts.

An additional object is to achieve the aforesaid objects in an AM-FM and FM stereo radio having a time-sampling type of stereo demodulator circuit.

Still other objects will be apparent from the following description and claim, and from the accompanying drawing.

The AM-FM radio de-emphasis circuit of the invention comprises, briefly and in a preferred embodiment, a de-emphasis network connected in an audio amplifier channel of the radio, and a compensation network adapted to be selectively connected into the radio circuit and having a frequency response characteristic to neutralize or counteract the effect of the de-emphasis network during AM reception. Thus, during FM reception the de-emphasis network is effective to achieve de-emphasis of the pre-emphasized FM audio signal, and during AM reception, although the de-emphasis network remains in the circuit, its effect is neutralized and rendered ineffective by the compensation network.

Further in accordance with the invention, in a receiver for selectively receiving AM and FM stereo broadcasts, a plurality of de-emphasis networks are respectively connected in the stereo audio channels, and a single compensation network is arranged to be selectively connected during AM reception into a single common amplifier channel preceding the multiple stereo amplifier channels.

In the drawing, the single figure is a schematic electrical diagram of a circuit in accordance with a preferred embodiment of the invention.

An antenna 11 picks up the FM stereo signal in conventional manner, and applies it to receiver circuits 12 which normally include, for reception of FM signals, a mixed circuit, intermediate-frequency amplifier stages, and a demodulator of the limiter-discriminator type or ratio-detector type. The output of the receiver circuits 12 at the FM output terminal 13, when FM stereo is received, comprises the composite signal in the form of an $L+R$ component in a range of some 50 to 15,000 cycles per second, a pilot signal at 19 kc. per second, and $L-R$ sidebands of a suppressed amplitude modulated subcarrier, these sidebands extending between 23 kc. per second and 53 kc. per second. When FM monaural broadcasts are received, the output at terminal 13 is the demondulated audio signal. The receiver circuits 12 also comprise conventional AM circuitry which may include a mixer circuit, an intermediate frequency amplifier circuit, and an AM detector, the output of which provides the demodulated monaural audio signal at the AM output terminal 14. If desired, some of the AM and FM circuitry in the receiver circuits 12 may constitute dual-functioning circuitry.

A switch 16 alternatively connects a terminal 17 to the FM output terminal 13 and the AM output terminal 14. An amplifier device 18 which is shown as comprising a vacuum tube, has a grid input electrode 19 connected via a coupling capacitor 21 to the terminal 17. A resistor 22 is connected between the grid 19 and the junction 10 of a resistor 23 and a potentiometer 24 which are connected in series between the cathode 26 of tube 18 and electrical ground, as shown. A capacitor 27 is connected between an adjustable tap 28 of the potentiometer 24 and electrical ground. This latter circuitry is described and claimed in patent application Ser. No. 269,374, filed Apr. 1, 1963, now Patent No. 3,258,540, and assigned to the same assignee as the present invention. A load resistor 29 is connected between the anode 31 of tube 18 and a terminal 32 of a source of operating voltage for the tube 18. A screen grid 15 of the tube 18 is connected to a voltage terminal 20 via a resistor 25, and is by-passed by a capacitor 30.

A coupling capacitor 33 is connected between the anode 31 and a terminal 34. A volume control potentiometer 36 is connected between the terminal 34 and electrical ground. A capacitor 37 and resistor 38 are connected in series between the terminal 34 and a tap 39 of an inductance 41. A pair of capacitors 42 and 43 are connected in series across the inductance 41, and in combination therewith provide a filter tuned to the pilot signal frequency of 19 kc., this filter being part of an oscillator circuit which functions as a synchronized switching signal generator designated generally by the numeral 44. The lower end of inductance 41 is grounded, and the upper end is coupled via a capacitor 46 to the grid 47 of an oscillator tube 48, the cathode 49 if this tube being connected to the junction of capacitors 42 and 43, and also being connected to electrical ground via a resistor 51. A resistor 52 is connected between the grid 47 and electrical ground. An oscillator output circuit 56, comprising an inductance 57 connected in parallel with a capacitor 58, is tuned to the 38 kc. switching signal, and a tap 59 of the inductance 57 is connected to the anode 61 of the oscillator tube 48. A switch 62 is arranged to connect oscillator operating voltage from a voltage terminal 63 to the end of the inductance 57 for reception of FM stereo signals, and to disconnect this operating voltage for reception of AM and FM monaural signals. The switching signal generator 44 oscillates due to the connection of the cathode 49 to the junction of the capacitors 42 and 43 thereby providing an oscillatory feedback arrangement at 19 kc., and a 38 kc. switching signal is produced in the output resonant circuit 56 in synchronism with or under control of the 19 kc. pilot signal that is filtered out and selected from the composite signal by the pilot filter comprising inductance 41 and capacitors 42 and 43.

The adjustable tap 66 of the volume control potentiometer 36 is connected via a resistor 67 to the control electrode 68 of an amplifier device 69 in the "A" channel. As shown in this embodiment, the amplifier device 69 may comprise a screen-grid type of tube having an input electrode 68 in the form of a control grid. A bias resistor 71 is connected between the cathode 72 and electrical ground, and has a resistance value suitable for biasing the tube 69 for normal amplifier functioning. A screen grid 73 of the tube 69 is connected to a junction 74 of a pair of voltage-dropping resistors 76 and 77 connected between a terminal 78 of operating voltage and electrical ground. A capacitor 79 is connected between the junction 74 and electrical ground. A primary winding 81 of an audio output transformer 82 is connected between the anode 83 of tube 69 and the operating voltage terminal 78. A secondary winding 84 of the transformer 82 is connected to a loudspeaker 86.

A "channel B" amplifier device 90, which may be a vacuum tube, has a control grid or electrode 91 connected via a resistor 92 to the volume control tap 66. A biasing resistor 93 is connected between the cathode 94 and electrical ground, and has a value similar to that of bias resistor 71, for biasing the amplifier tube 90 for normal Class A amplification functioning. A screen grid 95 of tube 90 is connected to the junction point 74 in order to obtain proper voltage, and a primary winding 96 of a channel B output transformer 97 is connected between the anode 98 of tube 90 and the operating voltage terminal 78. A secondary winding 99 of transformer 97 is connected to a channel B loudspeaker 100.

A pair of switching signal secondary windings 101 and 102 are inductively coupled to the inductance 57 of the 38 kc. oscillator output circuit and each has an end thereof connected to the adjustable volume control tap 66. In effect, these windings 101 and 102 constitute a single center-tapped winding having two halves 101 and 102. The remaining end of winding 101 is connected via a diode 103 to the input electrode 68 of channel A amplifier device 69, and the remaining end of the winding 102 is connected via a diode 104 to the input electrode of the channel B amplifier device 90. The diodes 103 and 104 are oriented in the circuit with respect to polarity, so that the switching signal from the secondary windings 101 and 102 will alternately switch the devices 69 and 90 off, but will not affect the "on" or amplification condition of these devices. In the example shown, using vacuum tubes, therefore, these diodes 103 and 104 are oriented in the circuitry so that negative-polarity half-cycles of the switching signal will pass through the diodes to the control electrodes 68 and 91 for alternatively rendering these amplifier devices inoperative, whereas during positive polarity of the switching signal half-cycles at the diode-connected ends of the windings 101 and 102, the diodes 103 and 104 are non-conductive and block positive-polarity switching signal half-cycles from the input electrodes 68 and 91 of the channel A and channel B amplifier devices. The circuit thus far described is the subject-matter of copending patent application Ser. No. 460,118, assigned to the same assignee as the present invention.

Capacitors 106 and 107 are respectively connected across the output transformer primary windings 81 and 96 and constitute, in combination with the plate impedances of tubes 69 and 90 and the impedances of the primary windings 81 and 96, combined de-emphasis networks for the FM audio signals and integrating networks for the pulsed audio information supplied by the switching tubes 69 and 90. This arrangement is the subject-matter of copending patent application Ser. No. 460,459, assigned to the same assignee as the present invention.

The circuit functions as follows for the reception of FM monaural and FM stereo signals; AM reception will be described subsequently.

For receiving FM monaural signals, the switch 16 is positioned to connect the terminal 17 to the FM receiver circuit output terminal 13, and the switching signal generator switch 62 is positioned to the inoperative terminal 65 for rendering the switching signal generator 44 inoperative. The monaural FM audio signal is then amplified by the amplifier device 18, by both of the amplifier devices 69 and 90, deemphasized by the capacitors 106 and 107 and associated circuitry, and applied to both of the loudspeakers 86 and 100.

For receiving FM stereo, the switch 16 is positioned as shown to connect the terminal 17 to the FM terminal 13, and the switching signal generator switch 62 is positioned to the "on" terminal 64 thereby causing the switching signal generator 44 to produce, under control of the 19 kc. pilot signal, a 38 kc. switching signal at the resonant circuit 57–58, and hence at the secondary windings 101 and 102. Due to the above-described orientation of the diodes 103 and 104 in the circuit, alternate half-cycles of the switching signal will render the channel A and channel B amplifier devices 69 and 90 alternately non-conductive, in proper phase so that when the channel B amplifier 90 is non-conductive, the channel A amplifier 69 will be in its normally conductive or amplifying condition, so as to sample an appropriate half-cycle of the composite signal, for example during the "left" information half-cycle of the reference wave, whereupon the left stereo audio signal will be integrated and de-emphasized by the capacitor 106 and associated circuitry and fed to the channel A reproducer 86. Similarly, during the switching signal half-cycles when the amplifier 69 is rendered non-conductive, the channel B amplifier device 90 will be in its normally "on" or amplifying condition, and will sample the "right" stereo information which is integrated and de-emphasized by the capacitor 107 and associated circuitry and fed to the reproducer 100.

The above-described network of resistor 24 and capacitor 27 increases the relative amplitude of the $L-R$ sidebands in the composite signal, so as to reduce the amount of cross-talk in the L and R stereo output signals—i.e. so as to reduce a small amount of undesired R that tends to occur in the L output signal and to reduce a small amount of undesired L that tends to occur in the R output signal.

To receive AM signals, the switch 16 is positioned to connect the terminal 17 to the AM terminal 14, so that the demodulated AM audio signal is applied to the input electrode 19 of the amplifier tube 18, and at the same time the oscillator switch 62 is positioned to the "off" terminal 65 thereby rendering the switching signal generator 44 inoperative. The AM audio signal is amplified by the amplifier 18 and applied, via the volume control 36 and resistors 67 and 92, to the input electrodes 68 and 91 of amplifiers 69 and 90. The resistors 67 and 92 have no appreciable effect on the audio signal. The AM audio signal is amplified by the amplifiers 69 and 90, and fed to both of the loudspeakers 86 and 100.

The higher frequencies of the AM audio signals are undesirably reduced in amplitude by the de-emphasis networks comprising the capacitors 106 and 107 and associated circuitry, even though AM audio usually extends only to 5 kc. and sometimes to 10 kc. in frequency as compared with the higher frequency response of FM audio (to 15 kc.) for which the de-emphasis networks are designed. This is because the standard de-emphasis, of 75 microsecond time constant, begins to be effective at about 2 kc. Of course, switches could be employed to disconnect the capacitors 106 and 107 during AM reception, but this is costly and inconvenient, due not only to the cost of two switches but also to the difficulty of locating and actuating the switches at the usually remote location of the capacitors 106 and 107 on the circuit chassis. Also, undesirable switching transients would occur if switching was performed in these high-power portions of the amplifiers. The present invention solves these problems in a new and improved manner.

In accordance with the invention, a switch 111 is provided, mechanically ganged to the AM-FM switch 16 and having a contact 112 for alternative connection to ground via a terminal 113 during AM reception, and to an unconnected terminal 114 during FM and FM stereo reception. The switch 111 may constitute an additional section of switch 16, thereby achieving economy by employing the same shaft and mounting means of the switch 16. A resistor 116 and capacitor 117 are connected in parallel between the switch contact 112 and the junction 10 of the resistor 23 and potentiometer 24. Thus, during AM reception the resistor 116 and capacitor 117 are connected across the potentiometer 24. The values of resistor 116 and capacitor 117 are chosen so that they provide a compensation network, when connected in the circuit, for boosting the amplitude of the higher frequencies of the AM audio signal in a manner converse to the reduction in these higher audio frequencies caused by the de-emphasis capacitors 106, 107 and associated circuitry. Suitable values for this network are one thousand ohms for resistor 116 and 0.22 microfarad for capacitor 117, when the potentiometer 24 has a resistance of 1,200 ohms. Thus, for AM reception the AM audio signals have an overall "flat" frequency characteristic despite the presence in the circuit of the de-emphasis capacitors 106 and 107, whereas during FM and FM stereo reception proper de-emphasis is achieved. The compensation network 116–117 provides frequency-selective degeneration in the cathode circuit of the amplifier 18, to achieve the aforesaid boosting of the higher audio frequencies.

The foregoing accomplishments of the invention are achieved with a single simple, and inexpensive compensation network, even when used in a stereo receiver, by the novel connection of the single compensation network in a common amplifier channel preceding the dual amplifier channels, so that the single compensation network compensates the effect of a plurality of de-emphasis networks in the plurality of audio output channels.

While a preferred embodiment of the invention has been shown and described, various other embodiments and modifications thereof will be apparent to those skilled in the art and will fall within the scope of invention as defined in the following claim.

What I claim is:

Stereo reception circuitry for receiving pre-emphasized stereo audio signals and also audio signals that are not pre-emphasized comprising; a single channel for a stereophonic composite signal including pre-emphasized stereo signal components, a time sampling switching circuit having a plurality of output terminals and connected to the output of said channel and adapted to derive a plurality of pre-emphasized stereo audio signals from said composite signal respectively at said output terminals, a plurality of de-emphasis networks respectively connected in the paths of said plurality of derived pre-emphasized stereo audio signals, means to selectively apply said audio signals that are not pre-emphasized to said single channel in lieu of said composite signal, said single channel including an amplifier device having input and output electrodes and a third electrode connected in common with the input and output of the amplifier, and a degeneration impedance connected in series with said third electrode to provide degeneration, and a compensation network comprising a resistor and a capacitor connected in parallel and including switch means for connecting said compensation network across at least a portion of said degeneration impedance during reception of said signals that are not pre-emphasized, said resistor and capacitor having values in conjunction with the value of said degeneration impedance to neutralize the effect of said plurality of de-emphasis networks on the frequency characteristics of said audio signals that are not pre-emphasized.

References Cited

UNITED STATES PATENTS

| | | | |
|---|---|---|---|
| 2,429,762 | 10/1947 | Koch | 329—135 |
| 3,069,679 | 12/1962 | Sweeney et al. | 179—15 |
| 3,123,673 | 3/1964 | Stumpers et al. | 179—15 |
| 3,151,216 | 9/1964 | Creamer et al. | 179—15 |
| 3,226,481 | 12/1965 | Wilson et al. | 179—15 |
| 3,250,857 | 5/1966 | De Vries et al. | 179—15 |

JOHN W. CALDWELL, *Acting Primary Examiner.*

ROBERT L. GRIFFIN, *Examiner.*